United States Patent [19]
Leidig et al.

[11] Patent Number: 5,822,625
[45] Date of Patent: Oct. 13, 1998

[54] HYBRID ELECTRONIC-FILM CAMERA

[75] Inventors: Carl Frederick Leidig; Richard William Lourette, both of Rochester, N.Y.

[73] Assignee: Eastman Kodak Company, Rochester, N.Y.

[21] Appl. No.: 879,895

[22] Filed: Jun. 20, 1997

Related U.S. Application Data

[63] Continuation of Ser. No. 803,045, Feb. 19, 1997, abandoned.

[51] Int. Cl.$^6$ .................................................. G03B 29/00
[52] U.S. Cl. ................................ 396/77; 396/429; 348/64
[58] Field of Search ................................ 348/64, 240, 1; 396/73, 75, 77, 429

[56] References Cited

U.S. PATENT DOCUMENTS

| | | | |
|---|---|---|---|
| 2,854,885 | 10/1958 | Robinson et al. | 88/16 |
| 4,148,072 | 4/1979 | Vockenhuber . | |
| 4,714,962 | 12/1987 | Levine | 358/209 |
| 4,829,384 | 5/1989 | Iida et al. | 358/229 |
| 4,843,475 | 6/1989 | Imai | 348/240 |
| 5,329,325 | 7/1994 | McClellan et al. . | |
| 5,398,062 | 3/1995 | Hashimoto et al. . | |
| 5,650,819 | 7/1997 | Sato et al. | 348/240 |

OTHER PUBLICATIONS

Ellis Betensky, "Zoom lenses for small CCD cameras", SPIE vol. 2539, pp. 2–11, Jun. 1995.

*Primary Examiner*—David M. Gray
*Attorney, Agent, or Firm*—Svetlana Z. Short

[57] ABSTRACT

An improved hybrid camera is provided for capturing an image photographically on film and electronically on an electronic sensor in which the image captured by the electronic sensor may be electronically cropped to match the image captured on the film. The camera includes a first lens having multiple focal lengths and a second lens having two selectable focal lengths. The image is focused through the first lens onto the film to capture the image photographically, while the image is focused through the second lens on an electronic sensor to capture at least the image electronically. A controller in the camera selects the focal length of the second lens to maximize the resolution of the portion of the image captured on the electronic sensor which matches the image captured on the film. The image captured on the electronic sensor may be cropped by the controller to match the image captured on the film. The controller can display the cropped image on a color LCD screen, thereby allowing the user to view the same image as captured on film, or store the cropped image in memory.

34 Claims, 5 Drawing Sheets

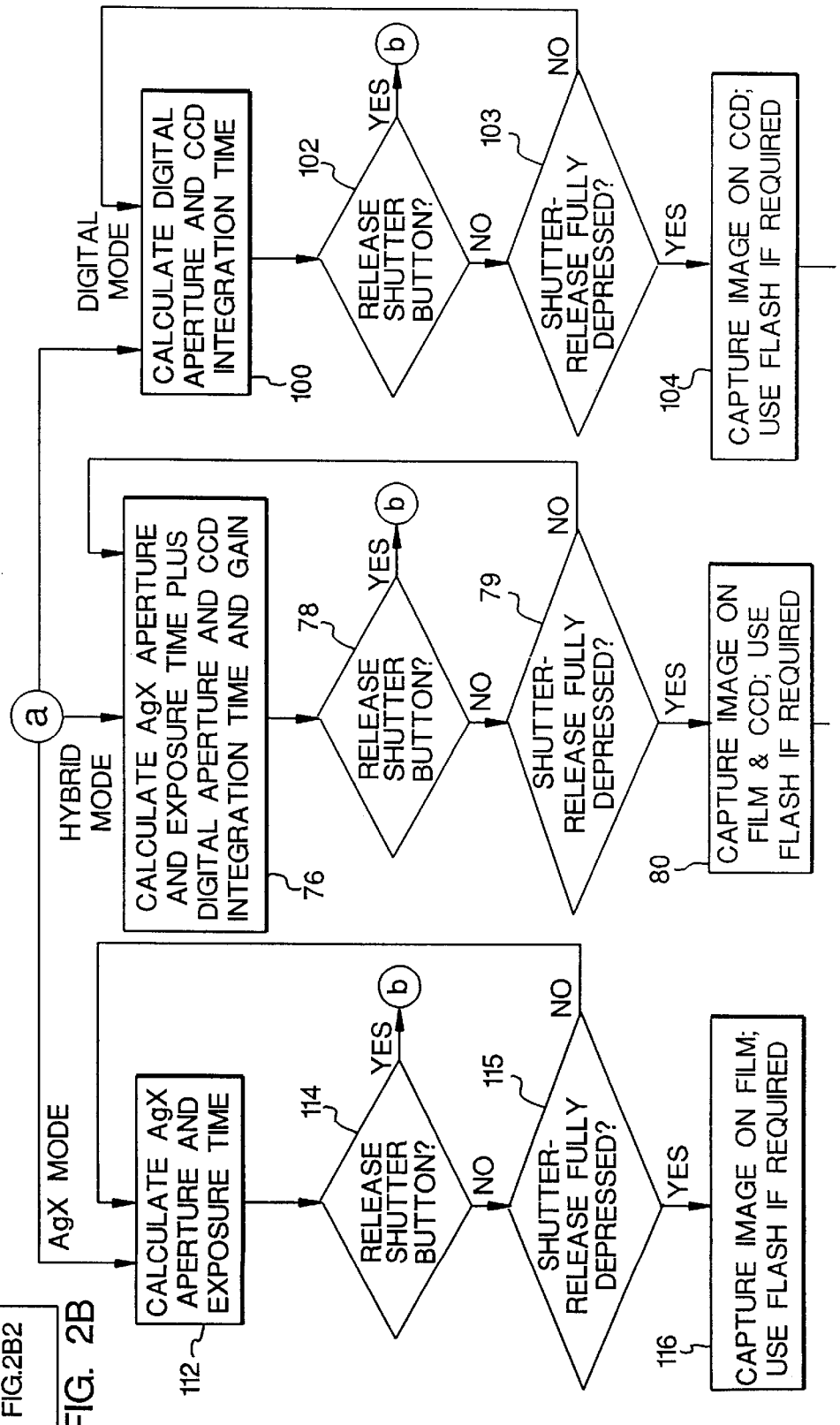

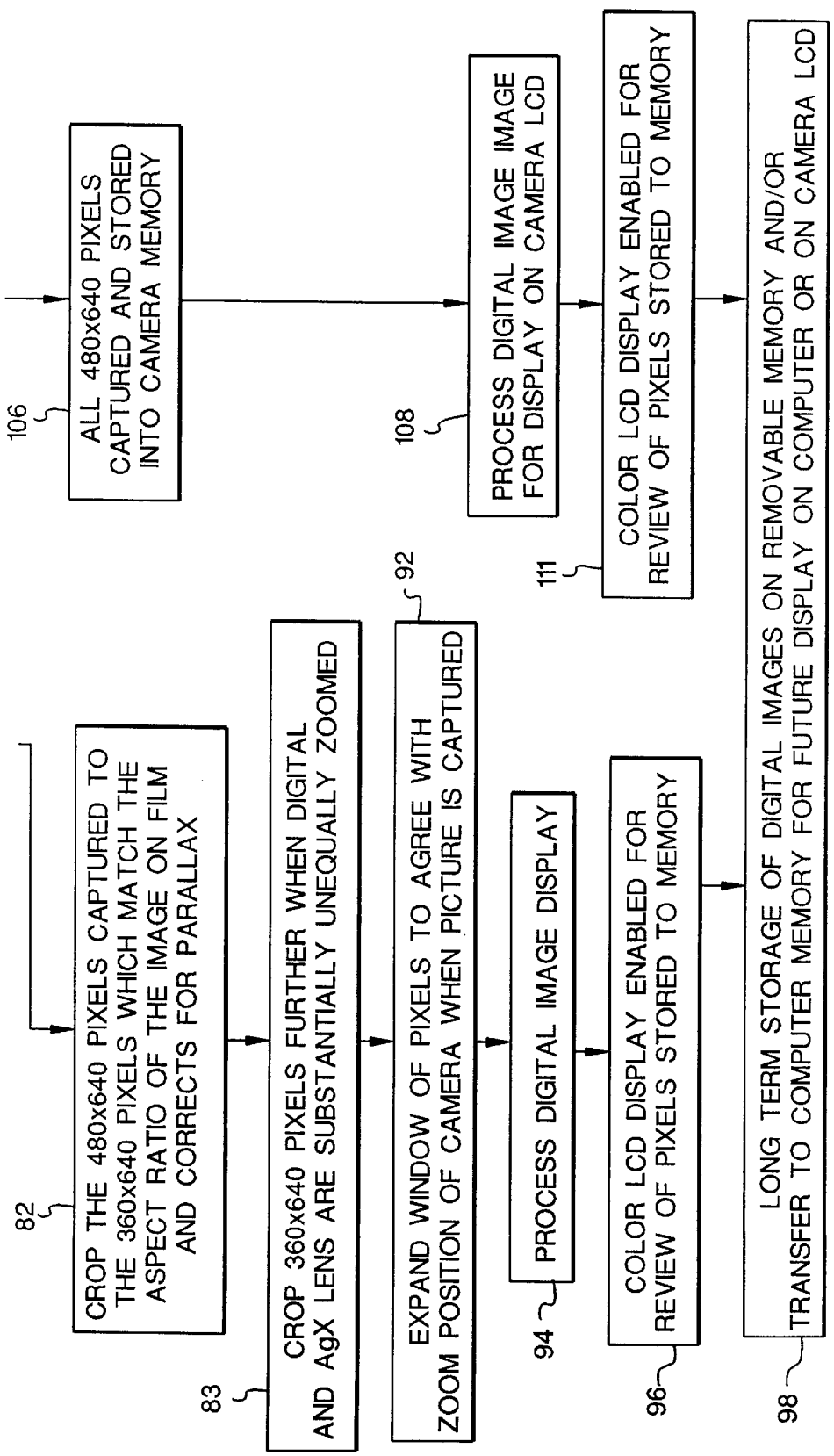
FIG. 2B2

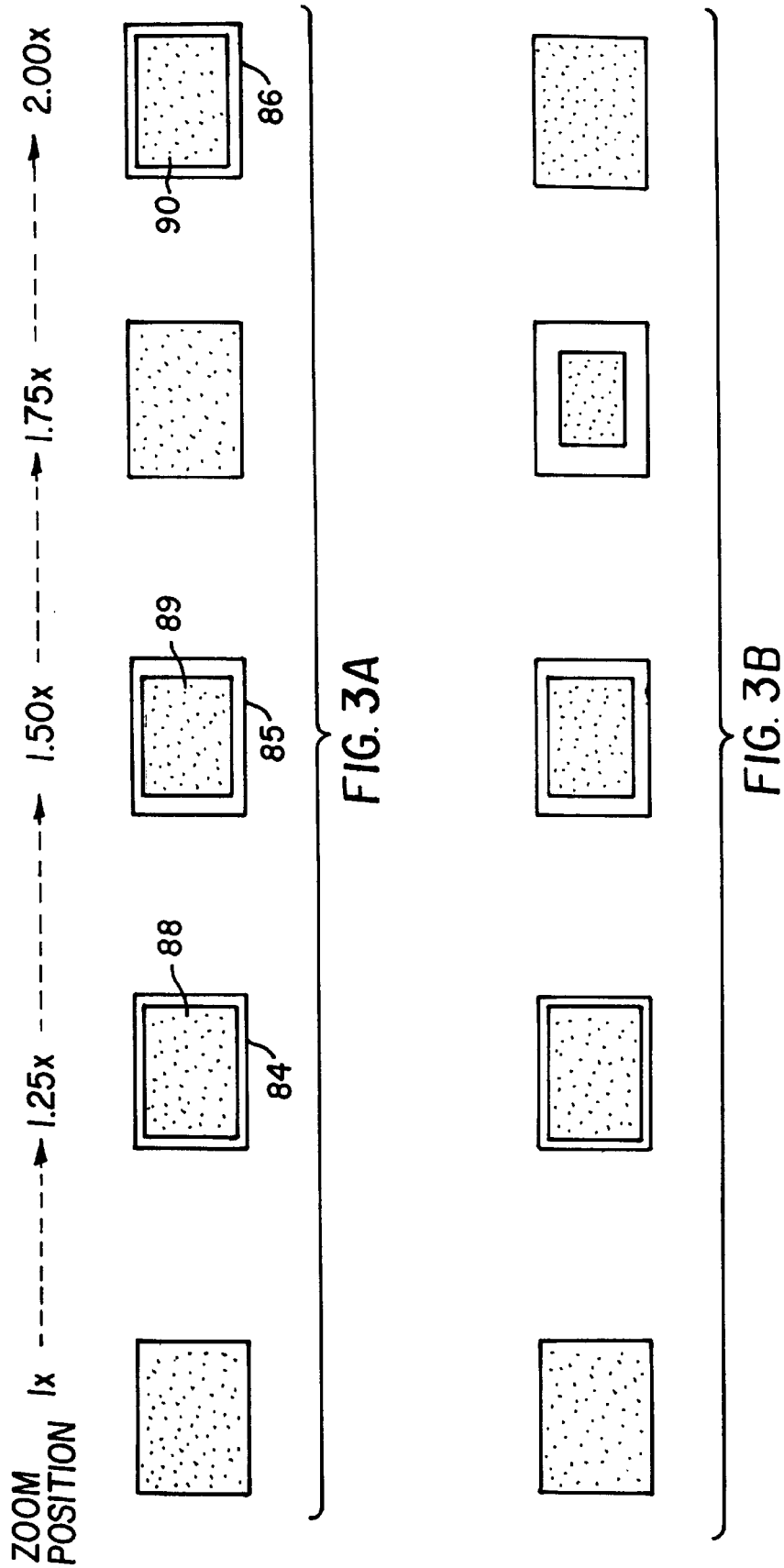

HYBRID ELECTRONIC-FILM CAMERA

CROSS-REFERENCE TO RELATED APPLICATIONS

This is a continuation of application Ser. No. 08/803,045, filed Feb. 19, 1997, now abandoned.

FIELD OF THE INVENTION

The present invention relates to a camera (and method) for capturing an image photographically and electronically, and relates particularly to, a camera for capturing an image photographically through a first multiple focal length lens and electronically through a second lens having two selectable focal lengths. The focal length of the second lens is selected to maximize the resolution of the portion of the electronically captured image which matches the photographically captured image.

BACKGROUND OF THE INVENTION

Hybrid cameras for the simultaneous capture of an image both photographically and electronically generally require that the image captured electronically matches the image captured photographically in terms of proportion (aspect ratio) and scene content. This is useful for maintaining an electronic record of images captured on film, for proofing latent photographic images, or other similar electronic-film imaging purposes. To provide zoom capability, such hybrid cameras may utilize two continuously variable zoom lens; one zoom lens through which an image is captured electronically on an electronic sensor, such as a CCD sensor array, and another zoom lens through which the image is captured photographically on film. These continuous zoom lenses can each be zoomed over different focal lengths up to its maximum zoom (or focal length) to provide various modes, extending from a wide angle mode through different telephoto modes at different zoom ratios. Zoom ratio is defined as the ratio of the focal length of the zoom lens divided by the shortest focal length of the lens, and the maximum zoom of a zoom lens is the longest focal length divided by the shortest focal length of lens. Matching the images captured electronically and photographically is prevented, however, when the zoom ratios of the two zoom lenses do not optically match over the focal lengths of each lens. Then, the electronic and photographic images captured will have different scene content, such that one image captured will have scene content that is a subset of the other captured image. In addition, matching is also prevented by parallax due to the different positions of the zoom lenses in a camera.

It has been proposed to mechanically couple the movement of the lens elements of separate continuous zoom lenses which respectively capture the image photographically and electronically, such that their zoom ratios match over various focal lengths. See U.S. Pat. No. 5,329,325 to McClellan et al., issued Jul. 12, 1994. Optically matching the zoom ratio is required in order that the pixels of the electronic array sensor represent the full latent photographic image captured on film. One drawback of optically matching the zoom ratios of such continuous zoom lenses is that the complexity, size, and cost of the camera is greatly increased because each continuous zoom lens requires at least two independent moving lens element groupings and a precision motor driven mechanism for moving the lens groups.

If the continuous zoom lens for capturing an image electronically is replaced by a fixed focus lens to deal with the drawbacks of using two continuous zoom lenses, the image captured on the electronic sensor would not match the scene content of the photographic image for different focal lengths of the continuous zoom lens.

It is a feature of the invention to provide a hybrid camera with zoom capability which can provide an electronic image matching the image captured photographically which does not depend on optically matching the zoom ratios of two continuous zoom lens, and further requires only one continuous zoom lens.

Further, it has been proposed that the two zoom lenses in a hybrid camera be positioned at an angle with respect to each other to correct for the parallax which prevents the images captured photographically and electronically from matching. This angle can be mechanically adjusted by the camera's user to correct for parallax. See also McClellan et al. One drawback to this proposal is that because the amount of parallax differs over the range of distances from the camera to the subject, different angles between the zoom lens are needed over this range to correct for parallax. Thus, the user must select the precise angle to correct for parallax. Further, as the distance between the camera and the subject in the image changes, the user may be required to reposition the angle between the zoom lenses to correct for parallax. This both introduces user error into the parallax correction and is time consuming.

In addition, it is another feature of the invention to provide a hybrid camera that does not depend on mechanical positioning the zoom lenses at an angle to correct for parallax.

SUMMARY OF THE INVENTION

Accordingly, it is the principal object of the present invention to provide an improved camera for and method of capturing an image both photographically and electronically.

Another object of the present invention is to provide an improved camera and method for capturing an image photographically through a first continuous zoom lens and electronically through a second lens having two selectable focal lengths in which the focal length of the second lens is selected to maximize the resolution of the portion of the electronically captured image matching the photographically captured image.

A further object of the present invention is to provide an improved camera and method for capturing an image electronically and photographically in which the electronically captured image may be electronically cropped to match the image captured photographically on film.

Briefly described, a camera is provided for capturing an image electronically and photographically which includes a first continuous zoom lens having multiple focal lengths and a second lens having two selectable focal lengths. The image is focused through the first lens onto film to capture the image photographically. The image is focused through the second lens on an electronic sensor to capture at least the image electronically. A controller is provided in the camera for selecting the focal length of the second lens to maximize the resolution of the portion of the image captured on the electronic sensor which approximately matches the image captured on the film.

The controller of the camera may further provide cropping of the image captured by the electronic sensor to match the image captured on the film in terms of proportion (i.e., aspect ratio) and scene content. The cropped image may be displayed on a color LCD screen on the camera or stored in memory.

BRIEF DESCRIPTION OF THE DRAWINGS

The foregoing objects, features and advantages of the invention will become more apparent from a reading of the following description in connection with the accompanying drawings, in which:

FIGS. 2A and 2B is a flow chart showing the program for operating the camera of FIG. 1; and FIGS. 3A and 3B are pictorials illustrating part of the cropping of the electronically captured image in the camera of FIG. 1.

DETAILED DESCRIPTION OF THE INVENTION

Figure 1:
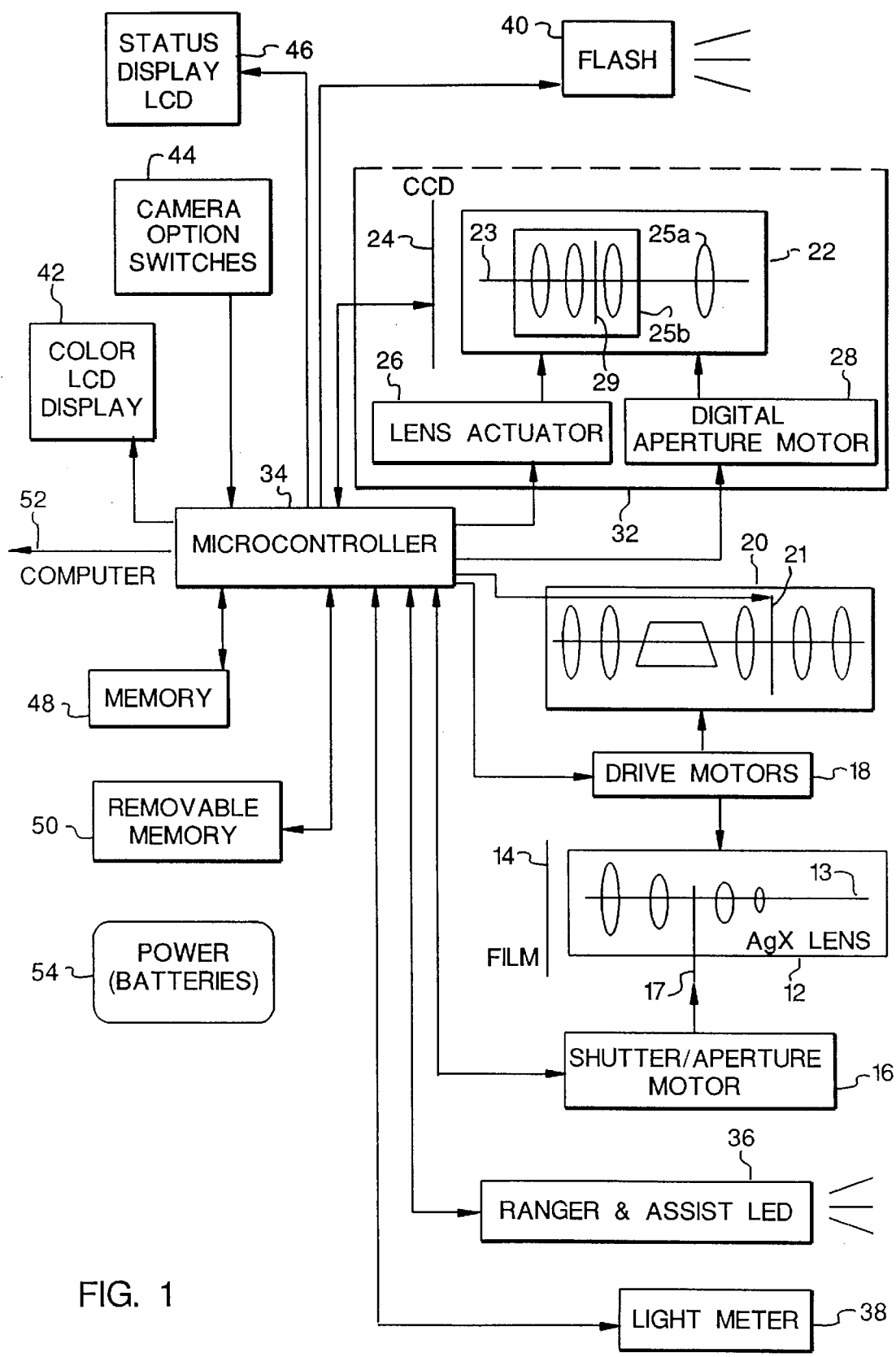
FIG. 1 is a block diagram of the camera in accordance with the present invention.

Referring to FIG. 1, a block diagram of a camera 10 in accordance with the present invention is shown. Camera 10 includes a film lens 12 through which an image is photographically captured on silver-halide (AgX) film 14. Film lens 12 is a continuous zoom lens such as used in a conventional compact camera for focusing an image at one of multiple focal lengths onto film 14. Preferably, film lens 12 has five discrete focal lengths ranging from approximately 31.0 mm to 57.9 mm. This provides a range of zoom ratios from approximately 1.0X to 2X (actually 1.87X), where zoom ratio is defined as the ratio of a specific focal length of the lens to the shortest focal length of the lens and is generally followed by "X". The five discrete focal lengths of film lens 12 enable zoom ratios (or zoom positions) of approximately 1X, 1.25X, 1.5X, 1.75X, and 2X, respectively. Although five focal lengths is described herein, film lens 12 may have fewer or more focal lengths over a smaller or larger range of zoom ratios.

Similar to a conventional zoom lens, film lens 12 has at least two moving lenses in which a first lens group is moved along an optical axis 13 to select the focal length of film lens 12 and the other lens group is moved along optical axis 13 to restore focus at the selected focal length. Drive motors 18 may be two stepper motors driving each lens group to a desired position along optical axis 13, or a single stepper motor in which both lens groups are driven via a gear and cam system. In film lens 12, an aperture 17, such as an iris, is positioned along optical axis 13 having an adjustable diameter to set the amount of light focused on film 14, i.e., the film aperture setting. This aperture also serves as a shutter for camera 10 to photographically image on film 14, but alternatively, a separate blade may provide a shutter in film lens 12 to block light from film 14 until the image is ready to be photographed. A shutter/aperture motor 16 drives aperture 17 to a desired film aperture setting or F-stop.

In addition to moving the lens groups in film lens 12, drive motors 18 may also move lens groups in viewfinder 20, a small continuous zoom lens which allows a user of camera 10 to visually perceive how an image through film lens 12 would likely appear. Drive motors 18 synchronize the movement of the lens groups in viewfinder 20 with the lens group in film lens 12 such that the zoom ratio of viewfinder 20 is identical to that of film lens 12.

Camera 10 further includes a digital lens 22 which focuses an image onto an electronic sensor 24, such as a CCD sensor array. Digital lens 22, in contrast to film lens 12, has two selectable focal lengths. Preferably, no focusing adjustment is required in the camera for imaging onto electronic sensor 24. In the preferred embodiment, digital lens 22 has two groups of lenses in which a first lens group 25a is fixed, and another lens group 25b moves towards and away from the first lens group along an optical axis 23 to obtain two different focal lengths. The moving lens group 25b is positioned along optical axis 23 by a lens actuator 26, such as a solenoid, to drive the moving lens group along optical axis 23 to each of the two focal lengths for digital lens 22. Since only one moving lens group is required for digital lens 22, digital lens 22 may be made less mechanically complex and smaller in size than a conventional zoom lens, which requires at least two moving lens groups. Digital lens 22 may be, for example, a dual power digital zoom lens as described in the article by Ellis Betensky, "Zoom lenses for small CCD cameras", SPIE Vol. 2539, pages 2–11, June 1995. In the preferred embodiment, two selectable focal lengths of digital lens 22 are provided at approximately 5.14 mm and at approximately 8.46 mm, which provides a zoom ratio of approximately 1X and approximately 1.75X (actually 1.65X), respectively. Other zoom ratios for digital lens 22 may be used so long as they are approximately equal to the zoom ratios at two of the five discrete focal lengths of film lens 12.

The image captured on electronic sensor 24 represents a digital image having a maximum resolution of 480×640 color pixels. Although other types of electronic sensors may be used in camera 10, a sufficient number color pixels should be employed to obtain a resolution needed for high resolution digital images after cropping is performed. Cropping of the digital image from electronic sensor 24 is described later in more detail.

An aperture 29 in digital lens 22 adjusts the amounts of light onto electronic sensor 24. Aperture 29 represents a slide having holes, e.g., five holes, of different diameters which may be centered on optical axis 23 to set the amount of light incident on electronic sensor 24, i.e., the digital aperture setting or F-stop. A digital aperture motor 28, such as a stepper motor, moves the slide perpendicular to optical axis 23 in order to drive the slide to a desired digital aperture setting. Digital lens 22, electronic sensor 24, lens actuator 26, and digital aperture motor 28 may all be part of a digital imaging system 32 in camera 10.

A microcontroller 34, such as a computer microprocessor, is provided in camera 10 which operates responsive to programmed instructions stored in its memory for controlling camera 10 operation. Microcontroller 34 controls the capturing of an image photographically on film 14 by sending signals to driver motors 18 and shutter/aperture motor 12, as well as controlling the conventional transport of film 14 within camera 10 to different frames. Further, microcontroller 34 controls the capturing of an image electronically on electronic sensor 24 by sending signals to lens actuator 26, digital aperture motor 28, and to electronic sensor 24 for setting the sensor's integration time and gain. Microcontroller 34 also receives the digital image from electronic sensor 24 after an image is electronically captured. These digital images may be processed by microcontroller 34 and then outputted to a color LCD display 42 for viewing by the user, stored in a memory 48 in camera 10, or outputted from camera 10 via line 52 to an external computer for viewing and storage. Memory 48 is non-volatile RAM which can store a number of digital images. Microcontroller 34 may further allow the user to review images stored in memory on color LCD display 42. Optionally, camera 10 may have removable memory 50, such as a high density magnetic disc or card for long term storage of digital images. Removable memory 50, for example, may be similar to that used in the Eastman Kodak digital camera model DC-50. In addition, microcontroller 34 can enable a flash 40 when capturing an image either photographically or electronically, or both.

As in conventional cameras for taking either photographic or electronic images, microcontroller 34 in camera 10 determines the amount of ambient light in the image to be captured, takes autorange measurements, and determines the speed (ASA) of film 14. The amount of ambient light is determined via light meter 38, or preferably, by operating digital imaging system 32 as a light meter. To operate system 32 as a light meter, microcontroller 34 sets up electronic sensor 24 to capture an image using the largest diameter digital aperture setting for aperture 29. Depending on the values of the pixels in the digital image captured by electronic sensor 24 and received by microcontroller 34, the amount of ambient light in an image to be captured is determined. Microcontroller 34 further performs an autorange measurement to determine the distance to the subject being imaged via a ranger and assist LED 36, where the assist LED is used to take a range measurement in dim ambient light. Also, microcontroller 34 can check the speed (ASA) of film 14 via typical ASA reading elements in conventional photographic cameras which sense the ASA on the film loaded in a camera. Based on the information about ambient light, distance to the subject, and film speed, microcontroller 34 can set up camera 10 for capturing an image photographically on film 14 or electronically on electronic sensor 24, as will be described in more detail later in connection with FIG. 2B. Camera option switches 44 are further provided in camera 10 to select various camera options or settings. One of switches 44 provides for allowing the user to toggle through various zoom positions at the five focal lengths of film lens 12, while another of switches 44 allows the user to select one of the following camera modes: hybrid (electronic-film) mode, film (AgX) mode, or digital mode. Hybrid mode refers to the camera 10 capturing the same image both electronically and photographically such that the digital image viewed on color LCD display 42, stored in memory 48, or outputted on line 52 matches the image captured photographically in terms of proportion (i.e., aspect ratio) and scene content. Film mode refers to capturing an image only photographically on film 14, while digital mode refers to capturing an image only electronically on electronic sensor 24. Other ones of switches 44 may be used to select various photographic settings, such as automatic flash (when insufficient ambient light for image capture is determined by microcontroller 34) or manual flash, manual exposure time on film 14, manual film/digital aperture settings, or other similar settings for electronic or photographic imaging.

A further one of switches 44 is the shutter-release button for capturing an image based on camera mode selected. Microcontroller 34 operates responsive to signals from switches 44 to control the operation of camera 10. Microcontroller can further sense when the shutter-release button is either half-depressed or fully-depressed. Optionally, additional switches 44 may be used for allowing the user to use the digital image outputted to color LCD display 42 as a viewfinder, instead of, or in addition to viewfinder 20, when capturing an image on film 14.

Status information is displayed by microcontroller 34 to the user on a status display LCD 46 in camera 10. Such status information for camera 10 may include the number of exposures left or taken, the camera mode, focal lengths of lens 12 or 22, or camera options or settings selected by switches 44 or set by microcontroller 34. Optionally, all or some status information may be displayed in a LCD display 21 in viewfinder 20, such as the depress status of the shutter-release button.

Microcontroller 34 may be a single microprocessor or several microprocessors working in conjunction. Preferably, two microprocessors are used for microcontroller 34 where one microprocessor is used only for operating digital imaging system 32, while the remaining functions of the camera are controlled by the other microprocessor. The components in camera 10 are powered by a power (battery) 54.

Responsive to the focal length of film lens 12 selected by the user via switches 44, microcontroller 34 in addition to setting the focal length of film lens 12 via driver motors 18, uses the focal length of the film lens 12 to select the focal length of digital lens 22 when camera 10 is in hybrid mode. At focal lengths of the film lens 12 which enable zoom ratios of approximately 1X, 1.25X and 1.5X, microcontroller 34 selects the focal length of digital lens 22 which provides approximately 1X zoom ratio. While at focal lengths of the film lens 12 which enable zoom ratios of approximately 1.75X and 2X, microcontroller 34 selects the focal length of digital lens 22 which provides approximately 1.75X zoom ratio. Microcontroller 34 may automatically switch the focal length of digital lens 22 from its shorter to longer length when the zoom ratio of film lens 12 changes from approximately 1.5X to 1.75X, and vice versa. Alternatively, driver motors 18 selecting the focal length of film lens 12 may be mechanically coupled to lens actuator 26 to provide such automatic switching between the two focal lengths of digital lens 22. Lens actuator 26 may be electronic solenoid or its mechanical equivalent. In a further alternative, lens actuator 26 may be a lever allowing the user to mechanically shift the position of the moving lens group of digital lens 22 to each one of its two focal lengths.

Figure 2A:
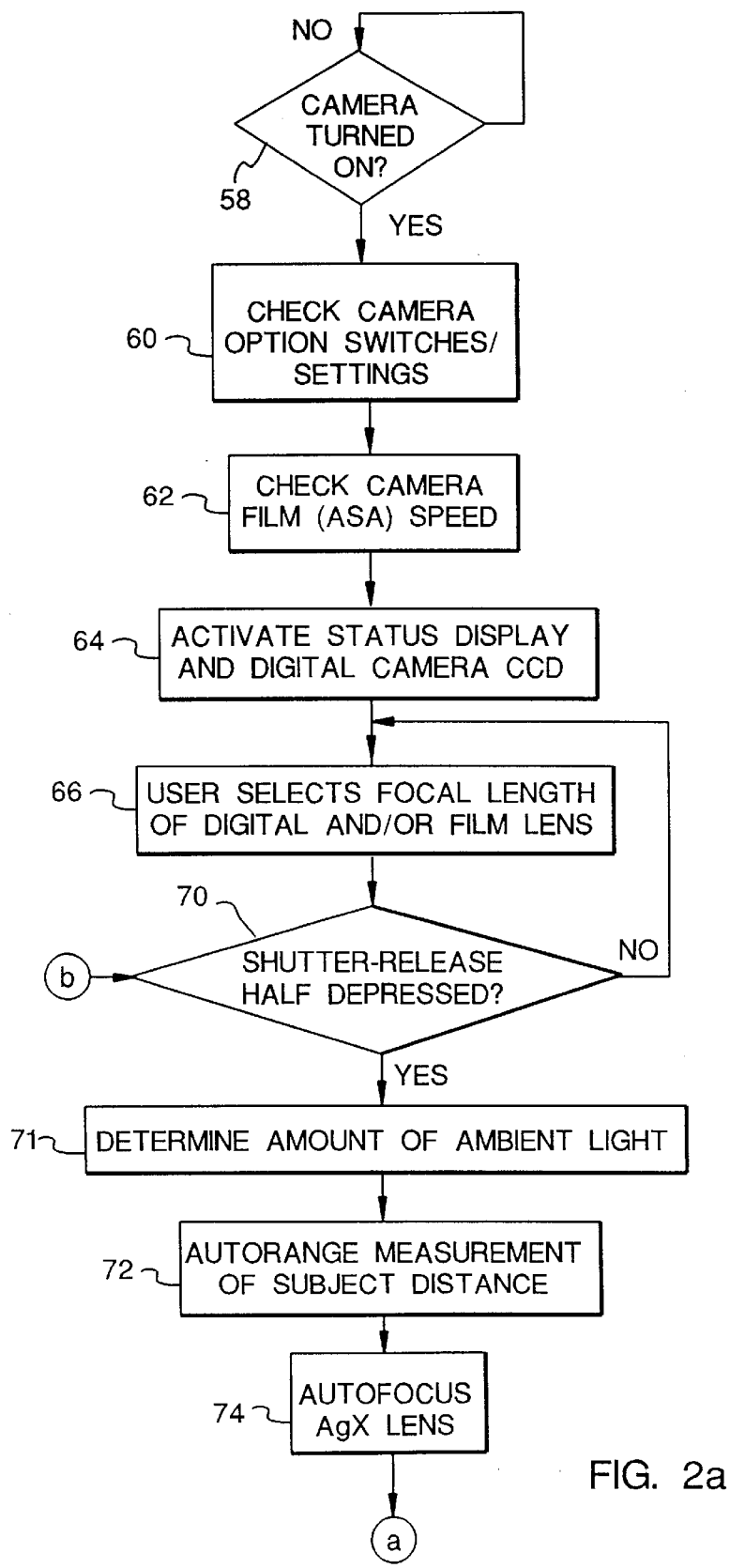

Referring to FIGS. 2A and 2B, a flowchart of the operation of camera 10 is shown which is embodied in the programming of microcontroller 34. The circled letters in the figures represent connecting branches. Camera 10 starts by checking if it has been turned on by the user (step 58). Until camera 10 is turned on, such as by lifting a camera cover, it maintains a sleep/low power mode to maintain images stored in memory 48. After camera 10 is turned on, microcontroller 34 checks camera option switches 44 to determine the camera settings (step 60), which includes the mode of the camera, one of hybrid, digital or film mode. Next at step 62, the camera film speed (ASA) is checked. Microcontroller 34 then activates status display LCD 46 and digital camera CCD, i.e., electronic sensor 24 (step 64).

Based on the selected camera mode, the user selects the focal length of either film lens 12 or digital lens 22 (step 66). For example, if hybrid or film mode was selected, then the user would select the focal length of the film lens, while if digital mode was selected, the user would select the focal length of only the digital lens. In hybrid mode, microcontroller 34 selects the shorter focal length of digital lens 22 to maximize the resolution of the portion of the image to be captured on electronic sensor 24 approximately (or most closely) matching the image to be captured on film 14 when the focal length of film lens provides zoom ratios of either approximately 1X, 1.25X, or 1.5X. The longer focal length of digital lens 22 is selected to maximize the resolution of the portion of the image to be captured on electronic sensor 24 approximately (or most closely) matching the image to be captured on film 14 when the focal length of film lens 12 provides zoom ratios of either approximately 1.75X or 2X. At all zoom ratios of film lens 12, the scene content in the image to be captured on electronic sensor 24 is greater than the scene content to be captured on film lens 12. This is useful for later cropping of the captured image on electronic sensor 24 to the portion which approximately matches the image captured on film 14 and also corrects for parallax. Preferably, to obtain greater scene content on electronic sensor 24 than on film 14 a sufficiently large electronic sensor is used, and the zoom ratio of lens 22 is selected to always be less than or approximately equal to the zoom ratio of lens 12 when an image is captured.

Camera 10 then waits for the shutter-release button to be half-depressed (step 70). Until this occurs, microcontroller 34 branches back to step 66 to update the user selected focal length for lens 12 or 22. Microcontroller 34 may further check switches 44 for any change in other user selected settings of camera 10 until the shutter-release button is half-depressed, and respond accordingly to such changes, such as changes in the camera mode. After the shutter-release button is half-depressed, microcontroller 34 at step 71 then determines the amount of ambient light, which may be in terms of an exposure number, such as typically used in a photographic camera. Preferably, the amount of ambient light is continuously updated until the shutter-release button is either released or fully-depressed by the user. Next, microcontroller 34 performs an autorange measurement to obtain the subject distance (step 72). Based on this subject distance, microcontroller 34 autofocuses film lens 12 (step 74). The steps in FIG. 2A are shown sequentially for purposes of illustration, they also may be performed by microcontroller 34 in parallel to improve processing efficiency.

Microcontroller 34 continues along one of three branches based on the camera mode. In hybrid mode, microcontroller 34 at step 76 calculates the film (AgX) aperture setting and exposure time for the shutter for photographic imaging through film lens 12. The film aperture setting and exposure time is determined based on the camera (ASA) film speed checked at step 62 and the amount of ambient light determined at step 71. The integration time and gain for electronic sensor 24 is also calculated based on the amount of ambient light at step 76 in order to capture an electronic image approximating the photographic image to be taken. If flash 40 is to be enabled when the image is captured, this may also affect the calculations at step 76.

After step 76, microcontroller 34 checks if the shutter-release button is released by the user, i.e., no longer half-depressed (step 78). If the shutter-release button is released, microcontroller branches back to step 70, otherwise it checks if the shutter-release button is fully-depressed (step 79). At step 79, if the shutter-release button is not yet fully-depressed, microcontroller 34 branches to the step 76 calculation to take into account any changes in the amount of ambient light. If the shutter-release button is fully-depressed, microcontroller 34 sets up camera 10 at the calculated film aperture setting and exposure time for capturing the image photographically on film 14 through film lens 12, and sets up camera 10 at the calculated gain, integration time, and digital aperture setting for capturing the image electronically on electronic sensor 24. The image is then captured photographically on film 14 and on the CCD, i.e., electronic sensor 24 (step 80). Flash 40 is used if required.

The captured digital image of 480×640 pixels is next cropped by microcontroller 34 to scale the captured digital image to the 360×640 pixels which match the aspect ratio of the image captured on film 14 and correct for parallax (step 82). Also at step 82, the cropped digital image of 360×640 pixels is stored in memory 48. The number of pixels in the digital image captured on electronic sensor 24 approximates a 3 by 4 aspect ratio (480 rows by 640 columns of pixels), and hence differs from the 9 by 16 aspect ratio of the image captured on film 14. Accordingly, only 360 consecutive rows of the 480 rows of pixels in the captured image are stored. The specific 360 consecutive rows stored is determined based on the amount of parallax to be accounted for due to the displacement of digital lens 22 from film lens 12 in camera 10 and the subject distance determined at step 72. For example, if the subject distance determined was at infinity, an equal number of pixels would be unused from the top and bottom of the pixels captured since parallax is approximately zero, and only the central 360 rows of pixels are taken and stored by microcontroller 34 from the 480 rows of pixels captured. Digital lens 22 may be located in camera 10 above film lens 12. Thus, as the distance to the subject becomes closer to camera 10 parallax increases, and as a consequence, more rows of pixels are used or taken from the top of the captured image than from the bottom of the captured image. The position of the rows taken and stored from the captured image depends on the geometry between the lenses 12 and 22 and the determined subject distance. Therefore, at step 82 the electronically captured image is both cropped to a 9 by 16 aspect ratio and corrected for parallax by selecting and storing the 360×640 captured pixels which matches at least the image captured on film 14. More than the image captured on film 14 is present in the 360×640 pixels stored if the zoom ratios of lens 12 and 22 were substantially unequal when the image was captured, while approximately the same image as captured on film is present in the 360×640 pixels stored if the zoom ratio of lens 12 and 22 were substantially equal when the image was captured.

After the 360×640 pixels are stored in memory they are further cropped by microcontroller 34 if digital lens 22 and film lens 12 are substantially unequally zoomed based on their focal lengths when the image was captured (step 83). Referring to FIGS. 3A and 3B, this cropping is illustrated. The 360×640 pixels stored in memory are shown at various zoom positions, i.e., zoom ratios, of film lens 12. FIG. 3A shows the preferred embodiment where the shorter of the two focal lengths for digital lens 22 is selected to enable a zoom ratio of approximately 1X for lens 12 when film lens 12 is at a focal length enabling zoom ratios for lens 12 of approximately 1X, 1.25X or 1.5X. While the longer of the two focal lengths for digital lens 22 is selected to enable a zoom ratio of approximately 1.75X for digital lens 22, when film lens 12 is at its focal length enabling zoom ratios for lens 12 of approximately 1.75X or 2X. When lens 12 and 22 are substantially equally zoomed, i.e., both at approximately 1X or 1.75X, the 360×640 pixels stored in memory at step 82 approximately match the image captured on film 14 in terms of content and proportion, and all the pixels in the stored digital image can be used for later processing. However, when lens 12 and 22 are substantially unequally zoomed, i.e., the zoom ratio of film lens 12 is substantially greater than the digital lens 22, only a central window within the 360×640 pixels stored matches the image captured on film 14 in terms of content and proportion. Accordingly, digital images 84, 85 and 86 are cropped by microcontroller 34 to a central window of pixels 88, 89 and 90, respectively, and only this central window of pixel is used for later processing. The amount of cropping in the stored image depends on the difference between the zoom ratios of lens 12 and 22 when the image was captured, such that more is cropped if lens 12 is at 1.5X, than at 1.25X or 2X.

FIG. 3B shows another embodiment in which the longer of the focal lengths of the digital lens 22 enables a zoom ratio of 2X for the digital lens. Thus, only when film lens 12 enables a zoom ratio of 2X is the longer focal length of digital lens 22 selected, and hence cropping to a central window at step 83 will be required when film lens 12 is at zoom ratios of approximately 1.25X, 1.5X, or 1.75X. This embodiment has a lesser number of pixels in the central window at 1.75X of film lens 12 than that is the case for the embodiment of the invention first described above. In this manner, camera 10 simulates a digital zoom lens having more than the two zoom positions set by the two selectable focal lengths of lens 22.

At step 92, microcontroller 34 expands a window of pixels, i.e., the digital image cropped at step 83, to agree with zoom position, i.e., zoom ratio, of camera 10 based on film lens 12 when the image was captured on film 14. Step 92 is not required if cropping was not performed at step 83. To expand the window of pixels, additional pixels are added based on the values of pixels in the stored digital image by bicubic or bilinear interpolation, or other similar pixel interpolation methods. For example, the central window of pixels 88, 89, or 90 in FIG. 3A may be expanded to include a sufficient number of pixels to equal 360×640 pixels, thereby providing a full digital image representing electronic zooming at approximately 1.25X, 1.5X, and 2X, respectively. The resulting digital image is stored in memory 48.

Next at step 94, the 360×640 pixel digital image stored in memory is then processed for display on color LCD display 42. This processing may include adjusting the white balance of the digital image or color filtering for the particular LCD display. Further, if color LCD display 42 cannot view all of the pixels of the digital image, the pixels may be undersampled prior to display. Color LCD display 42 is then enabled for review of pixels in the digital image stored in memory (step 96). The image displayed on color LCD display 42 may appear to track the image being seen by the user through viewfinder 20 when the image is captured. Optionally, the digital image stored in memory may be placed in long term storage on removable memory 50, or transferred to external computer memory over line 52 for further display on the external computer or on the camera's LCD display 42 (step 98). The camera is then ready to capture the next image.

When camera 10 is operating in digital mode, the digital aperture, integration time and gain for the CCD, i.e., electronic sensor 24, are calculated by microcontroller 34 (step 100). After step 100, if the shutter-release button is released by the user (step 102), microcontroller 34 branches back to step 70, otherwise, it checks if the shutter-release button is fully-depressed (step 103). At step 103, if the shutter-release button is not fully-depressed, microcontroller 34 branches to update the step 100 calculations to take into account any changes in the amount of ambient light. If the shutter-release button is fully-depressed, microcontroller 34 sets up camera 10 at the calculated gain, integration time, and digital aperture setting for the capture of an image electronically on electronic sensor 24. The image is captured on electronic sensor 24, and flash 40 is used if required (step 104). All the 480×640 pixels captured are stored in the camera memory 48 (step 106). The stored digital image is then processed at step 108 for display on color LCD display 42 similarly to step 94 described earlier. Color LCD image display 42 is then enabled and the 480×640 pixels stored in memory are reviewed by the user (step 110). The digital image may be then processed at step 98, as described above. Optionally, in both digital and hybrid modes, camera 10 may store in memory multiple sequential images, and review them on color LCD display 42 to simulate a moving picture.

In film (AgX) mode, microcontroller 34 at step 112 calculates the film exposure time and film aperture setting. After step 112, if the shutter-release button is released by the user (step 114), microcontroller 34 branches back to step 70, otherwise, it checks if the shutter-release button is fully-depressed (step 115). At step 115, if the shutter-release button is not fully-depressed, microcontroller 34 branches to update the step 112 calculations to take into account any changes in the amount of ambient light. If the shutter-release button is fully-depressed, microcontroller 34 sets up camera 10 at the calculated film aperture setting and exposure time for capturing the image photographically on film 14 through film lens 12. The image is then captured on film, and if required flash 40 is used (step 116).

In a further embodiment, camera 10 operating in a digital mode may after capturing an image on electronic sensor 24 utilize cropping at either of the two focal lengths selected for digital lens 22. Such cropping may involve selecting a window of pixels in the captured image, similar to step 83, except that other windows of pixels may be selected in addition to a central window. The cropped image may be expanded as described in step 92 to electronically zoom the window of pixels. In addition to the 480×640 pixel image from electronic sensor 24, the cropped image may also be stored in memory 48 and displayed on color LCD display 42 for review by the user.

Although the above describes capturing an image photographically on film 14 through lens 12, this also refers to other mechanisms for capturing an image through lens 12 such as capturing an image on video tape, similar to that of a typical camcorder. Thus, in hybrid mode, an image can be both captured on video tape and captured electronically on electronic sensor 24.

From the foregoing description, it will be apparent that there has been provided an improved camera and method for capturing an image both photographically and electronically. Variations and modifications in the herein described camera and method in accordance with invention will undoubtedly suggest themselves to those skilled in the art. Accordingly, the foregoing description should be taken as illustrative and not in a limiting sense.

What is claimed is:

1. A camera for capturing an image photographically and electronically comprising:

a first lens having multiple focal lengths and through which said image is focused onto film to capture said image photographically;

a second lens having two selectable focal lengths and through which said image is focused on an electronic sensor to capture at least said image electronically; and a controller for selecting the focal length of said second lens to maximize the resolution of the portion of said image captured on said electronic sensor which approximately matches the image captured on said film.

2. The camera according to claim 1 wherein said controller further comprises means for cropping said image captured by said electronic sensor to match the image captured on said film.

3. The camera according to claim 2 wherein said image produced by said electronic sensor is a digital image comprising pixels, and said cropping means further comprises means for storing in memory said cropped image.

4. The camera according to claim 3 wherein said cropping mean further comprises means for cropping the pixels in the digital image to scale said digital image to match the aspect ratio of said image captured on said film and to remove the effect of parallax between said image captured electronically and said image captured photographically, wherein said cropped image contains at least the image captured on said film.

5. The camera according to claim 3 wherein said cropping means further comprises means for cropping the pixels in said digital image to a central window matching the image captured on said film when said first and second lenses are unequally zoomed.

6. The camera according to claim 5 wherein said controller further comprises means for expanding, responsive to values of the pixels in said stored cropped image, the number of pixels in the said stored cropped image when said first and second lens are unequally zoomed.

7. The camera according to claim 2 further comprising mean, responsive to said controller, for displaying said cropped image.

8. The camera according to claim 1 wherein said electronic sensor is a CCD sensor array.

9. The camera according to claim 1 wherein said first lens is a continuous zoom lens.

10. The camera according to claim 1 further comprising:
one or more switches, wherein said controller is responsive to said switches for selecting the operating mode of said camera as one of capturing said image photographically and electronically through said first and second lens, respectively, only capturing said image photographically through said first lens, and only capturing said image electronically through said second lens.

11. The camera according to claim 1 further comprising:
means, responsive to said controller, enabling said controller to select one of said focal lengths of said second lens.

12. The camera according to claim 1 wherein said focal length of said second lens is selected by said controller responsive to the focal length of said first lens.

13. The camera according to claim 1 wherein said multiple focal lengths of said first lens enables said first lens to zoom between approximately 1X to 2X.

14. The camera according to claim 1 wherein said focal lengths of said second lens enables said second lens to zoom at approximately 1X or approximately 1.75X.

15. The camera according to claim 1 wherein said focal length of said second lens is selected by said controller to enable said second lens to zoom at approximately 1X when one of said multiple focal lengths of said first lens enables said first lens to zoom less than approximately 1.75X, and said focal length of said second lens is selected by said controller to enable said second lens to zoom at approximately 1.75X when one of said multiple focal lengths of said first lens enables said first lens to zoom between approximately 1.75X and 2X.

16. The camera according to claim 1 further comprising:
means for storing in memory the image captured by said electronic sensor; and
means for displaying said stored image.

17. A method for capturing an image photographically and electronically in a camera comprising:
capturing said image photographically onto film through a first lens having multiple focal lengths which focuses said image onto said film;
capturing at least said image electronically on an electronic sensor through a second lens having two selectable focal lengths which focuses said image on said electronic sensor; and
selecting the focal length of said second lens to maximize the resolution of the portion of the image captured on said electronic sensor which approximately matches the image captured on said film.

18. The method according to claim 17 further comprising the step of cropping said image captured by said electronic sensor to match the image captured on said film.

19. The method according to claim 18 wherein said image produced by said electronic sensor is a digital image comprising pixels, and said cropping step further comprises the step of storing in memory said cropped image.

20. The method according to claim 19 wherein said cropping step further comprises the step of cropping the pixels in the digital image to scale said digital image to match the aspect ratio of said image captured on said film and to remove the effect of parallax between said image captured electronically and said image captured photographically, wherein said cropped image contains at least the image captured on said film.

21. The method according to claim 19 wherein said cropping step further comprises the step of cropping the pixels in said digital image to a central window matching the image captured on said film when said first and second lenses are substantially unequally zoomed.

22. The method according to claim 21 further comprising the step of expanding, responsive to values of the pixels in said stored cropped image, the number of pixels in the said stored cropped image when said first and second lens are substantially unequally zoomed.

23. The method according to claim 18 further comprising the step of displaying said cropped image.

24. The method according to claim 17 wherein said electronic sensor is a CCD sensor array.

25. The method according to claim 17 wherein said first lens is a continuous zoom lens.

26. The method according to claim 17 further comprising selecting the mode of operation of the camera as one of carrying out said steps of capturing said image photographically and capturing said image electronically, carrying out said step of capturing said image photographically without carrying out said step of capturing said image electronically, and carrying out said step of capturing said image electronically without carrying out said step of capturing said image photographically.

27. The method according to claim 17 wherein said focal length of said second lens is selected responsive to the focal length of said first lens.

28. The method according to claim 17 wherein said multiple focal lengths of said first lens enables said first lens to zoom between approximately 1X to 2X.

29. The method according to claim 17 wherein said focal lengths of said second lens enables said second lens to zoom at approximately 1X or approximately 1.75X.

30. The method according to claim 17 wherein said focal length of said second lens is selected to enable said second lens to zoom at approximately 1X when one of said multiple focal lengths of said first lens enables said first lens to zoom less than approximately 1.75X, and said focal length of said second lens is selected to enable said second lens to zoom at approximately 1.75X when one of said multiple focal lengths of said first lens enables said first lens to zoom between approximately 1.75X and 2X.

31. The method according to claim 17 further comprising: storing in memory the image captured by said electronic sensor; and displaying said stored image.

32. The hybrid camera comprising:
a first lens having two selectable zoom positions and through which said image is focused on an electronic sensor to capture an image electronically;
a second lens having multiple zoom positions through which said image is focused onto film to capture said image photographically, wherein said multiple zoom positions approximately correspond to said two selectable zoom positions of said first lens and the additional zoom positions provided by said cropping means; and a controller for selecting the zoom position of said first lens having means for cropping the captured image to scale said captured image, and to approximate said captured image at zoom positions in addition to said two selectable zoom positions of said first lens.

33. A method for capturing an image in a hybrid camera comprising the steps of:

selecting the zoom position of a first lens, said first lens having two selectable zoom positions;

capturing said image electronically on an electronic sensor through said first lens;

cropping the captured image to scale said captured image; and cropping the captured image to approximate said captured image at zoom positions in addition to said two selectable zoom positions of said first lens.

34. The method according to claim 33 further comprising the step of:

capturing said image photographically on film through another lens having multiple zoom positions.

\* \* \* \* \*